United States Patent
Edwards et al.

(10) Patent No.: US 12,197,555 B2
(45) Date of Patent: *Jan. 14, 2025

(54) AUTHENTICATION QUESTION IMPROVEMENT BASED ON VOCAL CONFIDENCE PROCESSING

(71) Applicant: Capital One Services, LLC, McLean, VA (US)

(72) Inventors: Joshua Edwards, Philadelphia, PA (US); Tyler Maiman, Melville, NY (US); David Septimus, New York, NY (US); Daniel Miller, Brooklyn, NY (US); Viraj Chaudhary, Katy, TX (US); Samuel Rapowitz, Roswell, GA (US)

(73) Assignee: Capital One Services, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/594,467

(22) Filed: Mar. 4, 2024

(65) Prior Publication Data
US 2024/0211571 A1 Jun. 27, 2024

Related U.S. Application Data

(63) Continuation of application No. 17/349,355, filed on Jun. 16, 2021, now Pat. No. 11,954,192.

(51) Int. Cl.
*G06F 21/00* (2013.01)
*G06F 16/638* (2019.01)
*G06F 21/32* (2013.01)

(52) U.S. Cl.
CPC ............ *G06F 21/32* (2013.01); *G06F 16/638* (2019.01)

(58) Field of Classification Search
CPC ......... G06F 21/32; G06F 16/638; G06N 3/08; G10L 17/26; G10L 17/02; G10L 17/18; G10L 17/24; H04L 63/0861
See application file for complete search history.

(56) References Cited

U.S. PATENT DOCUMENTS

| 8,621,209 B1 | 12/2013 | Johansson et al. |
| 2014/0379339 A1 | 12/2014 | Timem et al. |

(Continued)

OTHER PUBLICATIONS

Jun. 17, 2020—Lausen, et al., "Emotion recognition and confidence ratings predicted by vocal stimulus type and prosodic parameters," Humanities and Social Sciences Communications 7, Article No. 2 (2020), <<https://www.nature.com/articles/s41599-020-0499-z>>, 50 pages.

(Continued)

*Primary Examiner* — William A Corum, Jr.
(74) *Attorney, Agent, or Firm* — Banner & Witcoff, Ltd.

(57) ABSTRACT

Methods, systems, and apparatuses are described herein for improving computer authentication processes using vocal confidence processing. A request for access to an account may be received. An authentication question may be provided to a user. Voice data indicating one or more vocal utterances by the user in response to the authentication question may be received. The voice data may be processed, and a first confidence score that indicates a degree of confidence of the user when answering the authentication question may be determined. An overall confidence score may be modified based on the first confidence score. Based on determining that the overall confidence score satisfies a threshold, data preventing the authentication question from being used in future authentication processes may be stored. The data may be removed when a time period expires.

20 Claims, 6 Drawing Sheets

(56) References Cited

U.S. PATENT DOCUMENTS

| | | | |
|---|---|---|---|
| 2015/0301796 | A1 | 10/2015 | Visser et al. |
| 2018/0232511 | A1 | 8/2018 | Bakish |
| 2020/0068031 | A1 | 2/2020 | Kursun et al. |
| 2020/0364511 | A1* | 11/2020 | Brown .............. G06F 16/3329 |
| 2022/0012316 | A1 | 1/2022 | Yarabolu |
| 2024/0248974 | A1* | 7/2024 | Douglas ............. G06V 40/70 |

OTHER PUBLICATIONS

Mar. 31, 2015, DiSalvo, "Your Brain Detects Confidence in Voices Faster Than You Can Blink," <<https://www.forbes.com/sites/daviddisalvo/2015/03/31/your-brain-detects-confidence-in-voices-faster-than-you-can-blink/?sh=103c86917365>>, 3 pages.

H.P. Greeley, et al., "Detecting Fatigue From Voice Using Speech Recognition," Using MFCC's for Fatigue Cues, publication date unknown, but prior to Jun. 3, 2021, <<https://www.isip.piconepress.com/publications/conference_proceedings/2006/ieee_isspit/fatigue_detection/paper_v07>>, 5 pages.

Xue, et al., "An Acoustic Automated Lie Detector," <<https://www.cs.princeton.edu/sites/default/files/alice_xue_spring_2019>>, date of publication unknown but, prior to Jun. 3, 2021, 23 pages.

K. Meena, et al., "Lie Detection System Using Input Voice Signal," International Journal of Pure and Applied Mathematics, vol. 117, No. 8, 2017, 121-125.

Jul. 6, 2018, Todd, "Detecting Deception: Speech and Voice as a Lie Detector," FSS, <<https://www.forensicstrategic.com/blog/detecting-deception-speech-and-voice-as-a-lie-detector>>, 5 pages.

Jul. 31, 2019, "Can a Robot Catch You Lying? A Machine Learning System to Detect Lies During Interactions," Frontiers in Robotics and AI, <<https://www.frontiersin.org/articles/10.3389/frobt.2019.00064/full>>, 28 pages.

Feb. 12, 2019, Nahari, et al., "Digging Further Into the Speech of Liars: Future Research Prospects in Verbal Lie Detection," <<https://www.frontiersin.org/articles/10.3389,fpsyt.2019.00056/full>>, 10 pages.

Mar. 18, 2014, Miller, "When everybody lies: Voice-stress analysis tackles lie detection," <<https://gcn.com/articles/2014/03/18/voice-risk-analysis.aspx>, 7 pages.

Piergiorgio Vittori "Ultimate Password: is voice the best biometric to beat hackers?" Biometric Technology Today, SJB Services, Somerton, GB, vol. 2019, No. 9, XP085863677, Oct. 1, 2019, pp. 8-10.

Haiyan Chen et al., "Investigating voice features for Speech emotion recognition based on four kinds of machine learning methods" 2019 IEEE 6th International Conference on Cloud Computing and Intelligence Systems (CCIS) IEEE, XP033762262, Dec. 19, 2019, p. 195-199.

Oct. 31, 2022—(EP) Extended European Search Report—App. No. 22179355.

* cited by examiner

How much did you spend at JOE'S COFFEE on Wednesday?

Presented Question
(501)

---

[1] "Umm"
[2] [1 Second Pause]
[3] "I'm not sure"
[4] [2 Second Pause]
[5] "Maybe five dollars?"

First Processed Voice Data
(502)

---

[1] [2 Second Pause]
[2] "Five dollars"

Second Processed Voice Data
(503)

FIG. 5

| User | Confidence Score | Day |
|---|---|---|
| User 1 | 65% Confident | Monday |
| User 2 | 50% Confident | Monday |
| User 1 | 70% Confident | Tuesday |
| *All Users* | *61.6% Confident* | *Monday - Tuesday* |

Overall Confidence Score
(601)

AUTHENTICATION QUESTION IMPROVEMENT BASED ON VOCAL CONFIDENCE PROCESSING

CROSS-REFERENCE TO RELATED APPLICATIONS

This application is a continuation of U.S. application Ser. No. 17/349,355, filed Jun. 16, 2021, entitled "Authentication Question Improvement Based on Vocal Confidence Processing," which is hereby incorporated by reference in its entirety.

FIELD OF USE

Aspects of the disclosure relate generally to account security and audio processing. More specifically, aspects of the disclosure may provide for improvements in the method in which authentication questions are provided for account security based on data indicating the confidence with which users answer those questions.

BACKGROUND

As part of determining whether to grant a user access to content (e.g., as part of determining whether to provide a caller access to a telephone system that provides banking information), a user of the user device might be prompted with one or more authentication questions. Such questions might relate to, for example, a password of the user, a personal identification number (PIN) of the user, or the like. Those questions might additionally and/or alternatively be generated based on personal information of the user. For example, when setting up an account, a user might provide a variety of answers to predetermined questions (e.g., "Where was your father born?," "Who was your best friend in high school?"), and those questions might be presented to the user as part of an authentication process. As another example, a commercially-available database of personal information might be queried to determine personal information for a user (e.g., their birthdate, birth state, etc.), and that information might be used to generate an authentication question (e.g., "Where were you born, and in what year?").

As part of authenticating a computing device, information about financial transactions conducted by a user of that computing device might be used to generate authentication questions as well. For example, a user might be asked questions about one or more transactions conducted by the user in the past (e.g., "Where did you get coffee yesterday?," "How much did you spend on coffee yesterday?," or the like). Such questions might prompt a user to provide a textual answer (e.g., by inputting an answer in a text field), to select one of a plurality of answers (e.g., select a single correct answer from a plurality of candidate answers), or the like. In some instances, the user might be asked about transactions that they did not conduct. For example, a computing device might generate a synthetic transaction (that is, a fake transaction that was never conducted by a user), and ask a user to confirm whether or not they conducted that transaction. Authentication questions can be significantly more useful when they can be based on either real transactions or synthetic transactions: after all, if every question related to a real transaction, a nefarious user could use personal knowledge of a legitimate user to guess the answer, and/or the nefarious user might be able to glean personal information about the legitimate user.

One risk in presenting authentication questions to users is that certain questions might be hard for legitimate users (that is, users entitled to access an account) to answer. For example, a legitimate user might have a hard time answering questions about transactions that were not memorable and/or which occur infrequently. In this unfortunate circumstance, even though the legitimate user should be provided access to their account, the user might nonetheless be prevented from accessing their account. Indeed, in such a circumstance, it might be particularly difficult for a system to distinguish between a legitimate but uncertain user and an unauthorized user (that is, a user not entitled to access an account) trying to guess the answer to an authentication question to gain unauthorized access to the account.

Aspects described herein may address these and other problems, and generally improve the safety of financial accounts and computer transaction systems by processing audio corresponding to answered authentication questions to determine user confidence when answering a question, then using that information to determine whether the question should be used for future authentication processes.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects described herein may allow for improvements in the manner in which authentication questions are used to control access to accounts. A user might request access to an account, and an authentication might be selected and presented to the user. For example, the question might be provided to the user over an Interactive Voice Response (IVR) call. Voice data indicating vocal utterances by the user might be received. That voice data might correspond to the user responding to the question. For example, the user might mumble, mutter to themselves, make noises evincing confusion, delay answering the question or the like. The voice data might be processed, and a first confidence score that indicates a degree of confidence of the user when answering the question may be determined. An overall confidence score might be modified based on the first confidence score. That overall confidence score might reflect a plurality of different confidence scores corresponding to a plurality of different users when answering the question. Based on the overall confidence score satisfying a threshold, data preventing the authentication question from being used in future authentication processes corresponding to one or more different users may be stored. In this manner, a question which induces undesirable confusion or hesitance in users might be avoided. The authentication question might later be re-introduced after a time period to see if, for example, the authentication question continues to introduce uncertainty.

More particularly, some aspects described herein may provide for a computing device comprising one or more processors; and memory storing instructions that, when executed by the one or more processors, cause the computing device to perform a variety of steps. The computing device may receive an indication of a request, from a user, for access to an account. The computing device may select, from an authentication questions database, an authentication question. The computing device may cause presentation, to the user, of the authentication question; receive voice data indicating one or more vocal utterances by the user in response to the authentication question. The computing device may process the voice data. The computing device may determine, based on the processed voice data, a first confidence score that indicates a degree of confidence of the user when answering the authentication question. The computing device may modify an overall confidence score based on the first confidence score. The computing device may, based on determining that the overall confidence score satisfies a threshold, store, in the authentication questions database, data preventing the authentication question from being used in future authentication processes corresponding to one or more different user.

According to some embodiments, the computing device may process the voice data by causing the computing device to: identify one or more words spoken by the user and identify at least one of the one or more words that indicates uncertainty. The computing device may process the voice data by causing the computing device to identify one or more periods where the user was silent. The computing device may remove, from the authentication questions database and after a period of time has elapsed, the data preventing the authentication question from being used in the future authentication processes. The computing device may store the data preventing the authentication question from being used in the future authentication processes further based on whether the user was provided access to the account. The overall confidence score may be based on a plurality of confidence scores, and wherein the plurality of confidence scores each comprise an indication of a different degree of confidence of a different user when answering the authentication question. The threshold may be based on a difficulty of the authentication question. The computing device may determine the first confidence score by causing the computing device to determine one or more of: a cadence indicated by the voice data; a speed of speech indicated by the voice data; a tone of speech indicated by the voice data; a volume of speech indicated by the voice data; or pronunciations (and/or mispronunciations) of words indicated by the voice data.

Corresponding method, apparatus, systems, and computer-readable media are also within the scope of the disclosure.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIG. 5 depicts an example of voice data processing.

FIG. 6 depicts an overall confidence score based on voice data from a plurality of different users.

DETAILED DESCRIPTION

Figure 1:
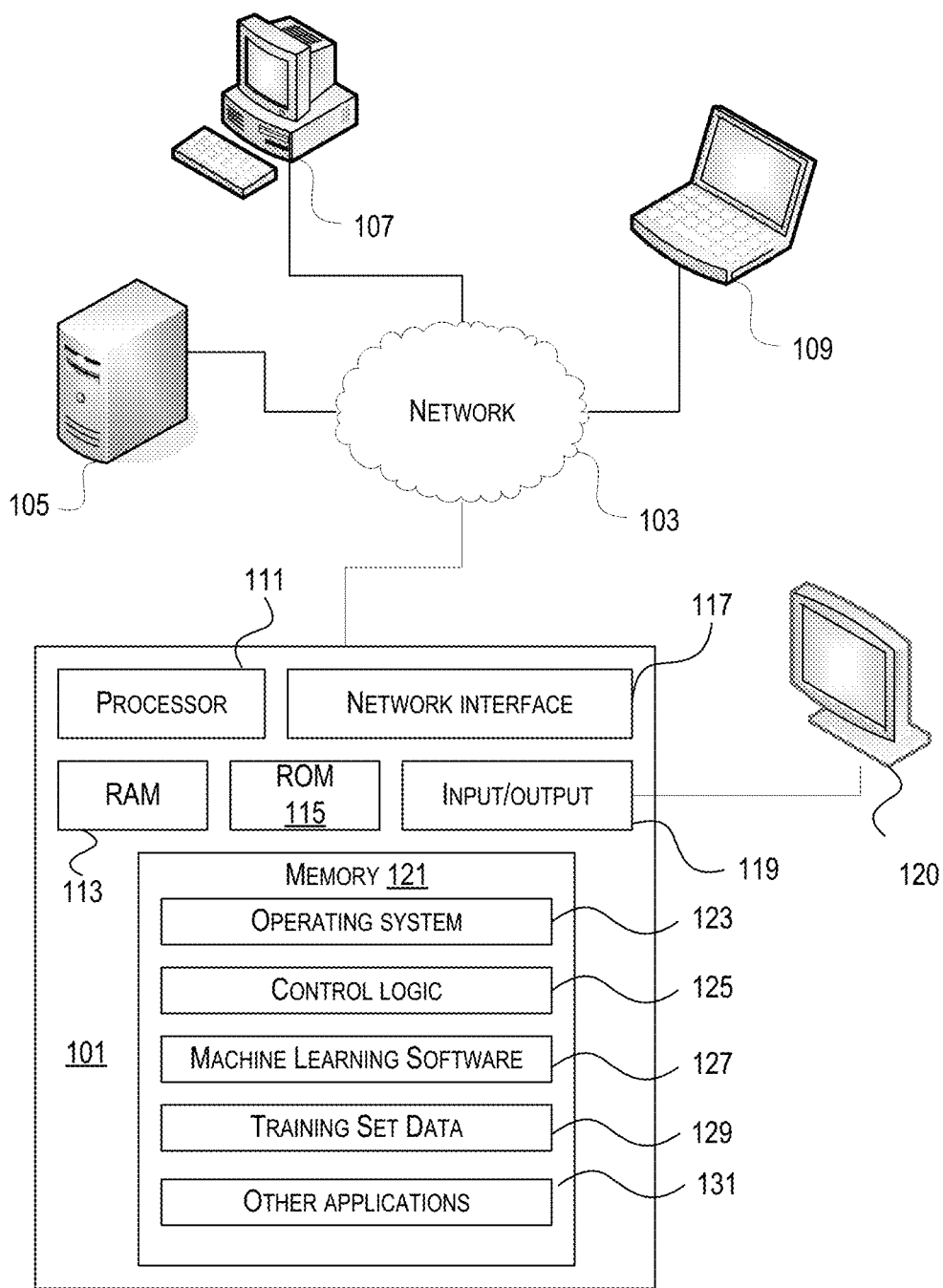
FIG. 1 depicts an example of a computing device that may be used in implementing one or more aspects of the disclosure in accordance with one or more illustrative aspects discussed herein.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof.

By way of introduction, aspects discussed herein may relate to methods and techniques for improving authentication questions used during an authentication process. In particular, the process depicted herein may prevent questions which confuse legitimate users from being used in authentication processes.

As an example of one problem addressed by the current disclosure, an authentication system might, as part of an authentication process for accessing an account, ask a user to identify how much they recently spent on coffee. While the user might be entitled to access the account, the user might have forgotten how much they spent on coffee. Indeed, such a question might be difficult for many users to answer: for example, coffee transactions might be so low-value, routine, and/or inconsequential so as to be not memorable to the average user. As such, the user might have difficulty answering the authentication question, and the user might be prevented from accessing their account, even though they should be provided access to that account.

Aspects described herein improve the functioning of computers by improving the way in which computers provide authentication questions and protect computer-implemented accounts. The speed and processing complexity of computing devices allows them to present more complicated authentications than ever before, which advantageously can improve the security of sensitive account information. That said, this processing complexity can unintentionally prevent legitimate users from accessing their accounts. Such a result is computationally wasteful at least in that it can cause legitimate users to repeatedly have to access their accounts to gain access, and because it can cause authentication systems to waste computational time generating authentication questions that do not actually improve the security of accounts. The processes described herein improve this process by processing voice responses to authentication questions and using that data to inform, over time, whether questions should be used in the authentication process. Such steps cannot be performed by a user and/or via pen and paper at least because the problem is fundamentally rooted in computing processes and requires steps (e.g., the processing of computerized audio data) which cannot be performed by a human being.

Before discussing these concepts in greater detail, however, several examples of a computing device that may be used in implementing and/or otherwise providing various aspects of the disclosure will first be discussed with respect to FIG. 1.

FIG. 1 illustrates one example of a computing device 101 that may be used to implement one or more illustrative aspects discussed herein. For example, computing device 101 may, in some embodiments, implement one or more aspects of the disclosure by reading and/or executing instructions and performing one or more actions based on the instructions. In some embodiments, computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

Computing device 101 may, in some embodiments, operate in a standalone environment. In others, computing device 101 may operate in a networked environment. As shown in FIG. 1, computing devices 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topology and may use one or more of a variety of different protocols, such as Ethernet. Devices 101, 105, 107, 109 and other devices (not shown) may be connected to one or more of the networks via twisted pair wires, coaxial cable, fiber optics, radio waves or other communication media.

As seen in FIG. 1, computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with machine learning. I/O 119 may include a variety of interface units and drives for reading, writing, displaying, and/or printing data or files. I/O 119 may be coupled with a display such as display 120. Memory 121 may store software for configuring computing device 101 into a special purpose computing device in order to perform one or more of the various functions discussed herein. Memory 121 may store operating system software 123 for controlling overall operation of computing device 101, control logic 125 for instructing computing device 101 to perform aspects discussed herein, machine learning software 127, and training set data 129. Control logic 125 may be incorporated in and may be a part of machine learning software 127. In other embodiments, computing device 101 may include two or more of any and/or all of these components (e.g., two or more processors, two or more memories, etc.) and/or other components and/or subsystems not illustrated here.

Devices 105, 107, 109 may have similar or different architecture as described with respect to computing device 101. Those of skill in the art will appreciate that the functionality of computing device 101 (or device 105, 107, 109) as described herein may be spread across multiple data processing devices, for example, to distribute processing load across multiple computers, to segregate transactions based on geographic location, user access level, quality of service (QoS), etc. For example, computing devices 101, 105, 107, 109, and others may operate in concert to provide parallel computing features in support of the operation of control logic 125 and/or machine learning software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product.

Figure 2:
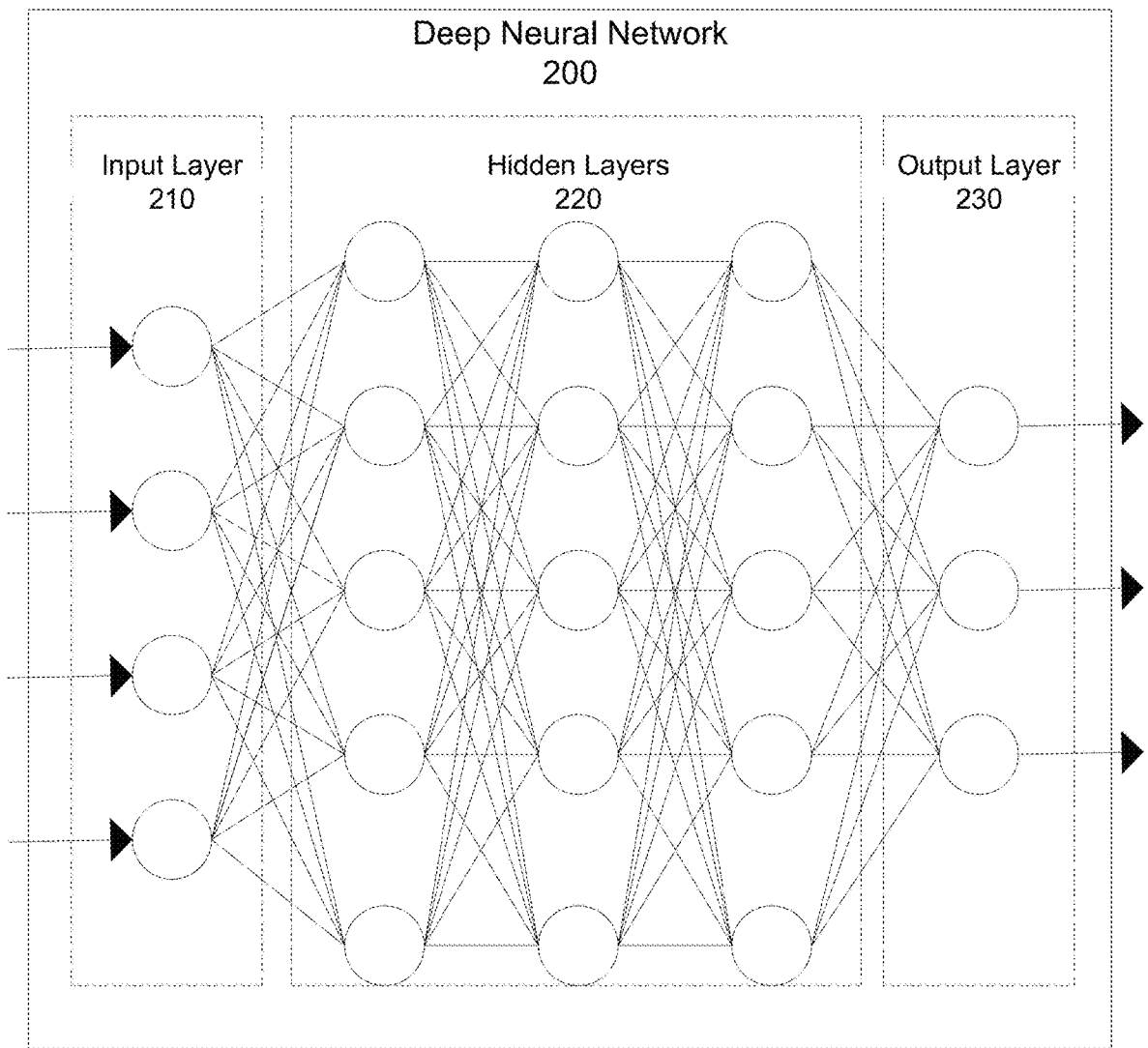
FIG. 2 depicts an example deep neural network architecture for a model according to one or more aspects of the disclosure.

FIG. 2 illustrates an example deep neural network architecture 200. Such a deep neural network architecture might be all or portions of the machine learning software 127 shown in FIG. 1. That said, the architecture depicted in FIG. 2 need not be performed on a single computing device, and might be performed by, e.g., a plurality of computers (e.g., one or more of the devices 101, 105, 107, 109). An artificial neural network may be a collection of connected nodes, with the nodes and connections each having assigned weights used to generate predictions. Each node in the artificial neural network may receive input and generate an output signal. The output of a node in the artificial neural network may be a function of its inputs and the weights associated with the edges. Ultimately, the trained model may be provided with input beyond the training set and used to generate predictions regarding the likely results. Artificial neural networks may have many applications, including object classification, image recognition, speech recognition, natural language processing, text recognition, regression analysis, behavior modeling, and others.

An artificial neural network may have an input layer 210, one or more hidden layers 220, and an output layer 230. A deep neural network, as used herein, may be an artificial network that has more than one hidden layer. Illustrated network architecture 200 is depicted with three hidden layers, and thus may be considered a deep neural network. The number of hidden layers employed in deep neural network 200 may vary based on the particular application and/or problem domain. For example, a network model used for image recognition may have a different number of hidden layers than a network used for speech recognition. Similarly, the number of input and/or output nodes may vary based on the application. Many types of deep neural networks are used in practice, such as convolutional neural networks, recurrent neural networks, feed forward neural networks, combinations thereof, and others.

During the model training process, the weights of each connection and/or node may be adjusted in a learning process as the model adapts to generate more accurate predictions on a training set. The weights assigned to each connection and/or node may be referred to as the model parameters. The model may be initialized with a random or white noise set of initial model parameters. The model parameters may then be iteratively adjusted using, for example, stochastic gradient descent algorithms that seek to minimize errors in the model.

Figure 3:
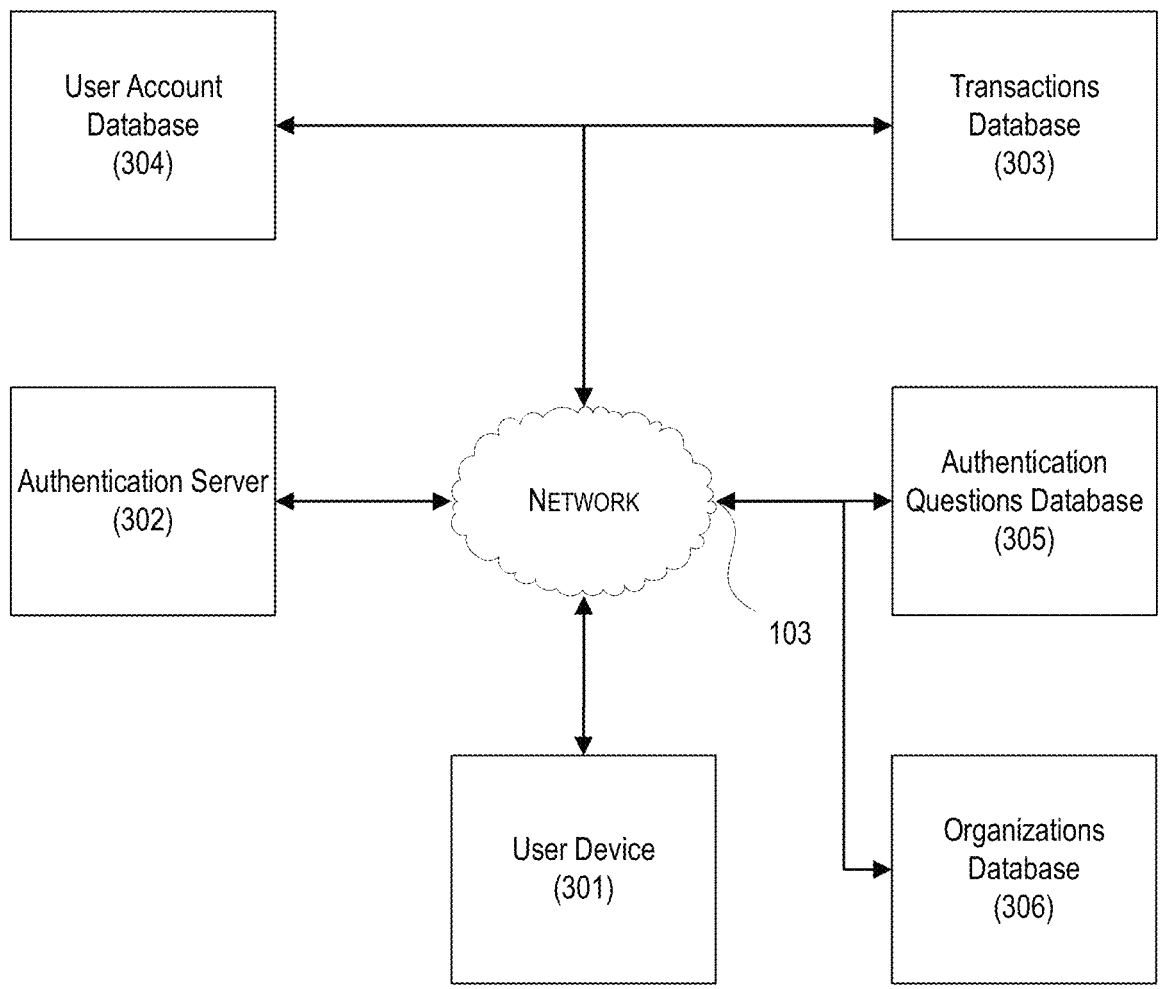
FIG. 3 depicts a system comprising different computing devices that may be used in implementing one or more aspects of the disclosure in accordance with one or more illustrative aspects discussed herein.

FIG. 3 depicts a system for authenticating a user device 301. The user device 301 is shown as connected, via the network 103, to an authentication server 302, a transactions database 303, a user account database 304, an authentication questions database 305, and an organizations database 306. The network 103 may be the same or similar as the network 103 of FIG. 1. Each of the user device 301, the authentication server 302, the transactions database 303, the user account database 304, the authentication questions database 305, and/or the organizations database 306 may be one or more computing devices, such as a computing device comprising one or more processors and memory storing instructions that, when executed by the one or more processors, perform one or more steps as described further herein. For example, any of those devices might be the same or similar as the computing devices 101, 105, 107, and 109 of FIG. 1.

As part of an authentication process, the user device 301 might communicate, via the network 103, to access the authentication server 302 to request access (e.g., to a user account). The user device 301 shown here might be a smartphone, laptop, or the like, and the nature of the communications between the two might be via the Internet, a phone call, or the like. For example, the user device 301 might access an IVR system associated with the authentication server 302, and the user device 301 might provide (e.g., over a phone call) candidate authentication credentials to that IVR system (e.g., answers to authentication questions spoken verbally by a user). The authentication server 302 may then determine whether the authentication credentials are valid. For example, the authentication server 302 might compare the candidate authentication credentials received from the user device 301 with authentication credentials stored by the user account database 304. In the case where the communication is an IVR system, the user device 301 need not be a computing device, but might be, e.g., a conventional telephone.

The user account database 304 may store information about one or more user accounts, such as a username, password, demographic data about a user of the account, or the like. For example, as part of creating an account, a user might provide a username, a password, and/or one or more answers to predetermined authentication questions (e.g., "What is the name of your childhood dog?"), and this information might be stored by the user account database 304. The authentication server 302 might use this data to generate authentication questions. The user account database 304 might store demographic data about a user, such as their age, gender, location, occupation, education level, income level, and/or the like.

The transactions database 303 might comprise data relating to one or more transactions conducted by one or more financial accounts associated with a first organization. For example, the transactions database 303 might maintain all or portions of a general ledger for various financial accounts associated with one or more users at a particular financial institution. The data stored by the transactions database 303 may indicate one or more merchants (e.g., where funds were spent), an amount spent (e.g., in one or more currencies), a date and/or time (e.g., when funds were spent), or the like. The data stored by the transactions database 303 might be generated based on one or more transactions conducted by one or more users. For example, a new transaction entry might be stored in the transactions database 303 based on a user purchasing an item at a store online and/or in a physical store. As another example, a new transaction entry might be stored in the transactions database 303 based on a recurring charge (e.g., a subscription fee) being charged to a financial account. As will be described further below, synthetic transactions might be based, in whole or in part, on legitimate transactions reflected in data stored by the transactions database 303. In this way, the synthetic transactions might better emulate real transactions.

The account data stored by the user account database 304 and the transactions database 303 may, but need not be related. For example, the account data stored by the user account database 304 might correspond to a user account for a bank website, whereas the financial account data stored by the transactions database 303 might be for a variety of financial accounts (e.g., credit cards, checking accounts, savings accounts) managed by the bank. As such, a single user account might provide access to one or more different financial accounts, and the accounts need not be the same. For example, a user account might be identified by a username and/or password combination, whereas a financial account might be identified using a unique number or series of characters.

The authentication questions database 305 may comprise data which enables the authentication server 302 to present authentication questions. An authentication question may be any question presented to one or more users to determine whether the user is authorized to access an account. For example, the question might be related to personal information about the user (e.g., as reflected by data stored in the user account database 304), might be related to past transactions of the user (e.g., as reflected by data stored by the transactions database 303), or the like. The authentication questions database 305 might comprise data for one or more templates which may be used to generate an authentication question based on real information (e.g., from the user account database 304 and/or the transactions database 303) and/or based on synthetic information (e.g., synthetic transactions which have been randomly generated and which do not reflect real transactions). The authentication questions database 305 might additionally and/or alternatively comprise one or more static authentication questions, such as an authentication question that is used for a wide variety of users (e.g., "What is your account number?"). An authentication question might correspond to a synthetic transaction (e.g., a transaction which never occurred). For example, a synthetic transaction indicating a $10 purchase at a coffee shop on Wednesday might be randomly generated, and the authentication question could be, e.g., "Where did you spent $10 last Wednesday?," "How much did you spend at the coffee shop last Wednesday?," or the like. In all such questions, the correct answer might indicate that the user never conducted the transaction. As part of generating authentication questions based on synthetic transactions, organizations might be randomly selected from a list of organizations stored by the organizations database 306. Additionally and/or alternatively, as part of generating such authentication questions based on synthetic transactions, real transactions (e.g., as stored in the transactions database 303) might be analyzed. In this manner, real transactions might be used to make synthetic transactions appear more realistic. The authentication questions database 305 might additionally and/or alternatively comprise historical authentication questions. For example, the authentication questions database 305 might comprise code that, when executed, randomly generates an authentication question, then stores that randomly-generated authentication question for use with other users.

The authentication questions stored in the authentication questions database 305 may be associated with varying levels of difficulty. For example, straightforward answers that should be easily answered by a user (e.g., "What is your mother's maiden name?") might be considered easy questions, whereas complicated answers that require a user to remember past transactions (e.g., "How much did you spend on coffee yesterday?") might be considered difficult questions.

The organizations database 306 might store data relating to one or more organizations, including indications (e.g., names) of organizations, aliases of the organizations, and the like. That data might be used to generate authentication questions that comprise both correct answers (e.g., based on data from the transactions database 303 indicating one or more organizations where a user has in fact conducted a transaction) and synthetic transactions (e.g., based on data from the organizations database 306, which might be randomly-selected organizations where a user has not conducted a transaction and which might indicate violations of a transaction rule). For example, a computing device might, as part of randomly generating a synthetic transaction using instructions provided by the authentication questions database 305, generate a synthetic transaction by querying the organizations database 306 for a list of organizations, then removing, from that list, organizations represented in the data stored by the transactions database 303.

Having discussed several examples of computing devices which may be used to implement some aspects as discussed further below, discussion will now turn to a method for processing voice data to determine whether authentication questions should no longer be used.

Figure 4:
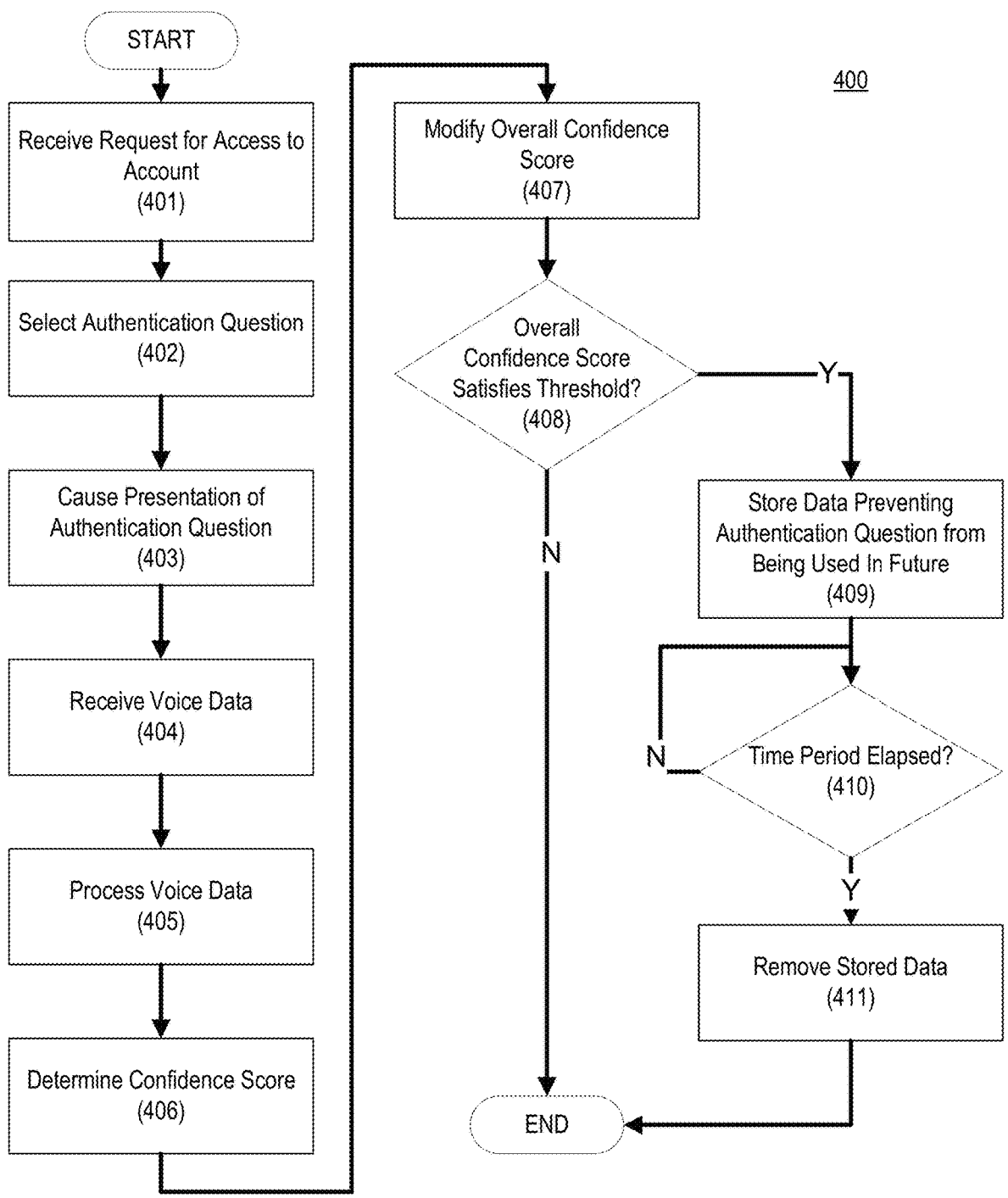
FIG. 4 depicts a flow chart comprising steps which may be performed for processing voice data and preventing authentication questions from being used in the future.

FIG. 4 illustrates an example method 400 for presenting authentication questions and processing voice data in accordance with one or more aspects described herein. The method 400 may be implemented by a suitable computing system, as described further herein. For example, the method 400 may be implemented by any suitable computing environment by a computing device and/or combination of computing devices, such as one or more of the computing devices 101, 105, 107, and 109 of FIG. 1, the user device 301, authentication server 302, transactions database 303, user account database 304, authentication questions database 305, organizations database 306, and/or any computing device comprising one or more processors and memory storing instructions that, when executed by the one or more processors, cause the performance of one or more of the steps of FIG. 4. The method 400 may be implemented in suitable program instructions, such as in machine learning software 127, and may operate on a suitable training set, such as training set data 129. The method 400 may be implemented by computer-readable media that stores instructions that, when executed, cause performance of all or portions of the method 400. The steps shown in the method 400 are illustrative, and may be re-arranged or otherwise modified as desired. For example, steps 410 and 411 may be omitted.

In step 401, the computing device may receive a request for access to an account. For example, the computing device may receive an indication of a request, from a user, for access to an account. The request may be associated with, for example, a user device calling into an IVR system or similar telephone response system. The request may additionally and/or alternatively be associated with access, by a user, to a website, an application, or the like. For example, the computing device may receive an indication of a request for access to an account responsive to a user accessing a log-in page, calling a specific telephone number, or the like. The request may specifically identify an account via, for example, an account number, a username, or the like. For example, a user might call an IVR system and be identified (e.g., using caller ID) by their telephone number, which might be used to query the user account database 304 for a corresponding account.

The request for access to the account might be provided to the authentication server 302, which might begin an authentication process. As will be detailed below, this authentication process may comprise asking a user one or more questions to determine whether the user is authorized to access an account.

In step 402, the computing device may select an authentication question. For example, the computing device may select, from an authentication questions database (e.g., the authentication questions database 305), an authentication question. The authentication question may be randomly selected, and/or might be based on one or more properties of the request received in step 401. For example, account data corresponding to the request received in step 401 might be identified in the user account database 304 and/or transactions data corresponding to the request received in step 401 might be identified in the transactions database 303, and all or portions of this identified data might be used to query the authentication questions database 305. In this manner, the authentication question selected from the database might be personalized to the user. For example, the authentication question selected from the authentication questions database 305 might be selected based on an age of the user, a geographic location of the user, or the like, as reflected by data stored by the user account database 304. Additionally and/or alternatively, the authentication question selected from the authentication questions database 305 might be selected based on past transactions conducted by an account as reflected in data stored by, e.g., the transactions database 303.

The authentication question selected might be one of a plurality of authentication questions provided to a user. For example, a user might be prompted to provide answers to a plurality of different authentication questions: one might prompt a user to provide a username, another might prompt the user to provide a password, and a third might prompt a user to indicate where they conducted their last financial transaction.

In step 403, the computing device may cause presentation of the authentication question. For example, the computing device may cause presentation, to the user, of the authentication question. The authentication question might be presented in an audio format using, e.g., a text-to-speech system, and/or by prompting a human being to read the question. The authentication question may additionally and/or alternatively be presented in a textual form (e.g., as part of a website or application prompt), in a video form (e.g., animated text), or the like. The computing device itself need not present the authentication question. For example, the computing device may cause another computing device (e.g., a text-to-speech system) to present the authentication question (e.g., over a telephone call).

In step 404, the computing device may receive voice data. The voice data may correspond to any form of sound made by a user, such as the user associated with the request received in step 401. For example, the computing device may receive voice data indicating one or more vocal utterances by the user in response to the authentication question. The voice data might be acquired by recording all or portions of a telephone call with the user. The voice data may additionally and/or alternatively be acquired by prompting the user to provide voice data via their computing device (e.g., the user device 301).

Because the voice data might be all or portions of a recorded telephone call, the voice data might be received after it has been determined that a user has preauthorized recording of the telephone call. For example, if a user calls into an IVR system using a telephone associated with a telephone number, the user account database 304 might be queried to determine whether the telephone number is associated with a preauthorization that allows calls to be recorded. Additionally and/or alternatively, a warning (e.g., "this call may be recorded for quality assurance purposes") might be provided during a call and before any recording is performed.

In step 405, the computing device may process the voice data. Processing the voice data may comprise determining one or more properties of the voice data. The properties might comprise a volume of a speaker, a cadence of a speaker, pauses taken by the speaker, one or more words spoken by the speaker, a tone of the speaker, a volume of the speaker, the pronunciation of the speaker (e.g., whether a speaker mispronounces words), whether a speaker made sounds other than words (e.g., "hmm," "huh"), or the like. As such, processing the voice data might comprise processing the voice data using one or more voice transcription algorithms to determine one or more words, sounds, and/or phrases made by the user and convert those words, sounds, and/or phrases into text. Processing the voice algorithm may additionally and/or alternatively comprise use of audio processing algorithms. For example, to improve the performance of one or more voice transcription algorithms, voice data may be pre-processed to remove background noise, amplify speech, remove pops or crackle sounds, and/or the like.

Processing the voice data may comprise identifying one or more words spoken by the user and identifying at least one of the one or more words that indicates uncertainty. Words and phrases such as "I don't know," "dunno," "I'm not sure," and the like may indicate that a speaker is unsure regarding their answer. As such, these words and phrases might be evidence that a legitimate user has difficulty answering an authentication question. As will be detailed below, this may be grounds for no longer using the authentication question, because such uncertainty on the part of a legitimate user might be undesirable at least in that it suggests that a legitimate user might be unable to answer an authentication question and thereby blocked from access to their account.

To determine which words, phrases, and/or sounds evince uncertainty, data might be stored that comprises one or more words, phrases, and/or sounds that indicate uncertainty. For example, a database (e.g., any one of the databases shown in FIG. 3) might store a list of words known to indicate uncertainty. As another example, a database might store data that indicates pauses longer than three seconds indicate uncertainty. As yet another example, a database might store a predetermined number of sounds made by a user (e.g., "hmm") that, while not necessarily words, indicate uncertainty.

Processing the voice data may comprise identifying one or more periods where the user was silent. As with the words indicating uncertainty discussed above, periods of silence might suggest that a speaker is unsure regarding their answer. For example, multiple-second pauses on the part of a legitimate user might suggest that the legitimate user is having difficulty remembering the answer to an authentication question. Because background noise and other undesirable sounds might exist in the voice data (even if pre-processed, as discussed above), it is not necessary that the periods of silent correspond to absolutely no audio data during a period. Rather, a period of silence might merely indicate that no audio is made by a particular user over a period of time. Also, not all silences necessarily indicate uncertainty. For example, a user might be very confident in their answer, but might be delayed in providing their answer because, for example, they are distracted when answering the question. Accordingly, whether silence indicates uncertainty might be based on the context of the silence, such as whether or not the voice data includes other indicia of uncertainty (e.g., words indicative of uncertainty).

In step 406, the computing device may determine a confidence score. A confidence score may indicate any subjective and/or objective score of the confidence of a user in answering the authentication question presented in step 403. For example, the computing device may determine, based on the processed voice data, a first confidence score that indicates a degree of confidence of the user when answering the authentication question. In this manner, the confidence score might be based on determining, during processing of the voice data, whether a cadence of the voice data suggested confidence, whether a speed of speech in the voice data indicated confidence, whether a tone of speech in the voice data indicated confidence, whether a volume of speech in the voice data indicated confidence, and/or whether pronunciations (and/or mispronunciations) of words in the voice data indicated confidence. The confidence score may be reflected as a Boolean value, such as an indication of whether or not the user sounded confident. The confidence score may additionally and/or alternatively be reflected as a value, such as a percentage value (e.g., 46%) that indicates a perceived degree of confidence of a user. The confidence score may additionally and/or alternatively be reflected as a subjective evaluation, such as "Very Confident," "Somewhat Confident," "Not Confident," and the like.

Determining the confidence score may be performed with the aid of a trained machine learning model. A machine learning model (e.g., as implemented via the deep neural network architecture 200) may be trained using training data (e.g., the training set data 129). The training data may comprise a plurality of voice data sets that are, e.g., tagged with corresponding confidence scores. Additionally and/or alternatively, the training data might comprise transcriptions of voice data sets and corresponding confidence scores. Using this training data, the machine learning model may learn to correlate, e.g., voice data (whether in the form of the audio data, transcribed audio data, or the like) and confidence scores. In this manner, the trained machine learning model may be able to take input comprising voice data and/or transcribed voice data and return, as output, a confidence score. For example, the computing device may train a machine learning model to identify confidence based on voice data, provide, as input to the trained machine learning model, the voice data received in 404 (and processed in step 405), and receive, as output from the trained machine learning model, an indication of the confidence score.

Determining the confidence score might be based on scoring all or portions of the processed voice data. During processing, the voice data might be subdivided into various portions (e.g., discrete words and/or phrases spoken by the user, periods of silence, various sounds made by the user), and, as part of determining the confidence score, each of these portions might be scored based on a degree of confidence indicated by the portion. Then, the sum of the scores might indicate the overall confidence of the processed voice data. In this manner, various portions of the processed data indicating user confidence might be compared to other portions of the processed data indicating a lack of confidence, and the confidence score might reflect an overall confidence of the processed voice data.

Determining the confidence score might be based on an expected difficulty of the authentication question. For particularly difficult authentication questions, it might be expected for a legitimate user to be somewhat hesitant, as they might have difficulty precisely remembering the answer to tough authentication questions. For example, while a legitimate user might be able to answer a question like "Did you shop at RESTAURANT A yesterday?" somewhat easily because the question relates to a recent transaction, the same user might have difficulty answering "Did you shop at RESTAURANT A last month?" because it involves older, potentially forgotten activity. As such, authentication questions might be associated with an expected difficulty. An expected difficulty might be represented as, for example, a subjective value (e.g., "Difficult," "Very Difficult," "Easy"), an expected failure rate for legitimate users (e.g., "50% of legitimate users forget the answer to this question"), an expected time period before a legitimate user can answer the question (e.g., "it takes a legitimate user approximately 3 seconds to remember the answer to this question"), or the like. As part of determining the confidence score, the expected difficulty might be compared to the actual difficulty exhibited by a user. For example, if an authentication question is associated with an "easy" expected difficulty but the user seemed to exhibit significant difficulty in answering the question during authentication, the confidence score might be relatively low. In contrast, if an authentication question is associated with a "hard" expected difficulty but the user easily answered the question, then the confidence score might be relatively high. In this manner, the confidence score determined in step 406 might be determined in view of the difficulty of the authentication question.

In step 407, the computing device may modify an overall confidence score. An overall confidence score might correspond to a particular authentication question or group of authentication questions, and might indicate the confidence of one or more users when answering the authentication question. For example, the computing device may modify an overall confidence score based on the first confidence score such that, e.g., the overall confidence score reflects an average of a plurality of different confidence scores. The overall confidence score need not be a discrete value, and might be instead reflected by a database comprising each of a plurality of different confidence scores. For example, the overall confidence score might comprise data, for a particular authentication question, that indicates every confidence score received for that authentication question.

The overall confidence score may be based on a plurality of confidence scores. The plurality of confidence scores may each comprise an indication of a different degree of confidence of a different user when answering the authentication question. In this manner, the overall confidence score might reflect the confidence of a plurality of different users when answering the same authentication question, even if the answer to that authentication question might be different for the different users.

The overall confidence score may be modified based on determining that the user provided a correct answer to the authentication question. In some instances, an unauthorized user might attempt to gain access to an account. In such circumstances, the uncertainty expressed by the unauthorized user might indicate that the unauthorized user cannot answer an authentication question, which is in many cases a desirable result (as, after all, the authentication question may be designed such that they should not be able to answer the question easily or at all). In this case, the confidence score of the unauthorized user should not be added to the overall confidence score, as otherwise the overall confidence score might not properly reflect the confidence of legitimate users entitled to access the account. On the other hand, where the user is determined to be a legitimate user and is ultimately provided access to the account, the overall confidence score may be modified based on the legitimate user's confidence score. In this way, the overall confidence score may reflect the confidence of legitimate users.

In step 408, the computing device may determine whether the overall confidence score has satisfied a threshold. The threshold might be configured to reflect a circumstance where the authentication question is known to invoke user uncertainty. In other words, the determination in step 408 reflects whether an authentication question is known, based on the overall confidence score, to be associated with low user confidence in answering the question. If the answer to step 408 is no, the method 400 may end. If the answer to step 408 is yes, the method 400 may proceed to step 409.

The threshold may be based on a difficulty of the authentication question. The threshold for a relatively easy authentication question might be different than the threshold for a relatively difficult authentication question. After all, intentionally difficult authentication questions might cause a user to pause or otherwise be uncertain slightly more often than an intentionally easy authentication question. In turn, if users regularly exhibit a lack of certainty when answering an easy authentication question, this might particularly suggest that the authentication question is poorly formatted or otherwise unintentionally causes uncertainty.

The threshold might be based on an identity of the user. The user account database 304 might indicate one or more properties of a user, such as an age of the user, a location of the user, and the like. As such, the threshold might differ based on these properties. For instance, younger users might, on average, be more uncertain than older users. In such a circumstance, the threshold for the younger users might be different than the threshold for older users.

In step 409, the computing device may store data preventing the authentication question from being used in the future. The data might be stored in, e.g., the authentication questions database 305. For example, based on determining that the overall confidence score satisfies a threshold, the computing device may store, in the authentication questions database, data preventing the authentication question from being used in future authentication processes corresponding to one or more different users. In this manner, the data might effectively prevent a question that regularly causes uncertainty in users from being used in future authentication processes.

The data may be stored based on whether the user was provided access to the account. As indicated above with respect to step 408, the overall confidence score may be configured to reflect the confidence of legitimate users, rather than unauthorized users. In turn, the data preventing the authorization question from being used in the future might be based on a determination that legitimate users did not have confidence in answering the authentication question, such that the authentication question should no longer be presented to legitimate users.

The data stored might be for an authentication question or category of authentication questions. For example, based on the overall confidence score, data may be stored that prevents an authentication question and similar authentication questions from being used in the future. In this manner, the overall confidence score for one authentication question might cause a plurality of authentication questions to no longer be presented to users.

As will be discussed below with regard to step 410 and step 411, though the data stored in step 409 might cause an authentication question (and/or similar authentication questions) to no longer be provided during an authentication process, it may nonetheless be desirable to re-introduce the authentication question (and/or similar authentication questions) in the future after a period of time has elapsed. Doing so may allow the system to periodically test whether authentication questions continue to elicit confusion in users. After all, historical changes might cause users to more easily remember the answer to authentication questions which they, prior to those changes, would have had difficulty remembering. For example, a global pandemic may render it temporarily difficult to purchase toilet paper or gasoline such that, while users might have had trouble remembering such transactions in the past, they may find it significantly easier to remember such transactions during the global pandemic.

In step 410, the computing device may determine whether a time period has elapsed. The time period may correspond to the data stored in step 409. In this manner, the data stored in step 409 (that is, the data that prevents a particular authentication question or category of authentication questions from being used in the future) might be stored for only a period of time, such that an authentication question might later be re-introduced and re-used in the far future. If so, the method 400 may proceed to step 411. Otherwise, the process may wait until the time period has elapsed, as reflected by the arrow in FIG. 4 returning to the top of step 410.

In step 411, the computing device may remove the stored data. The data might be removed after the time period has elapsed (as determined in, e.g., step 410). For example, the computing device may remove, from the authentication questions database (e.g., the authentication questions database 305) and after a period of time has elapsed, the data preventing the authentication question from being used in the future authentication processes.

FIG. 5 depicts examples of processed voice data. FIG. 5 comprises an example of a presented question 501 and examples of first processed voice data 502 and second processed voice data 503. The content shown in FIG. 5 represents data which might be stored and/or output by computing devices and, as such, need not be in the format presented in FIG. 5. Rather, the manner in which the content is depicted is for illustration purposes only.

The presented question 501 may be presented as step 403 of FIG. 4. The question asks a user how much they spent at a coffee shop on Wednesday. Such a question might be, in this circumstance, particularly difficult for a legitimate user to answer: for example, the price of coffee at the coffeeshop might not be particularly memorable to the user.

The first processed voice data 502 reflects an example of voice data that has been processed in accordance with step 405 of FIG. 4. In this example, the voice data has been transcribed and broken down into five different portions: the phrase "Umm," a one-second pause, the phrase "I'm not sure," a two-second pause, and the phrase "Maybe five dollars?". These five portions all might indicate a relatively low degree of confidence, by a user, in their answer. In particular, since all five different answers indicate some degree of uncertainty, the first processed voice data 502 might indicate that the user is significantly uncertain regarding their answer. In some circumstances, the confidence score might be based on a count of the number of portions of the processed voice data indicate confidence or a lack of confidence. For example, a confidence score based on the first processed voice data 502 might be, for example, 0% or an integer value of 0 (e.g., that all five portions indicate uncertainty). That said, more fine-detailed confidence scores might be implemented. For example, because the first, second, and fourth portions of the first processed voice data 502 might not necessarily indicate a lack of confidence (and might just indicate that the speaker is slow and/or distracted), the confidence score for the first processed voice data 502 might be, for example, 60%, $3/5$, 3, or the like.

The second processed voice data 503 reflects another example of voice data that has been processed in accordance with step 405 of FIG. 4. In this example, the voice data has been transcribed and broken down into two different portions: a two-second pause, and the phrase "five dollars." In this example, in comparison to the first processed voice data 502, the uncertainty might be said to be significantly less. For example, while the two-second pause might sometimes indicate uncertainty, the definitive answer given by the user might indicate confidence. The confidence score for the second processed voice data 503 might be, for example, 100%, or a similar value that indicates a relatively high amount of confidence.

FIG. 6 depicts an overall confidence score 601 that has been generated for a plurality of different users. The overall confidence score 601 reflects confidence scores for two different users from the period of Monday through Tuesday when answering a particular authentication question. In particular, FIG. 6 illustrates that the overall confidence score 601 need not be a single value, but might instead be a record of historical confidence scores over time when various users answer a particular authentication question, and further indicates that the overall confidence score 601 might indicate an average of historical confidence scores over time. In the overall confidence score 601 shown in FIG. 6, a first row 602*a* is a header row, which indicates that the first column is a user indication, the second column indicates a corresponding confidence score, and the third column indicates a day during which the voice data (that is, the voice data that was processed and which led to the confidence score) was received. A second row 602*b* indicates that, on Monday, User 1 was 65% confident when answering the authentication question. A third row 602*c* indicates that, on Monday, User 2 was 50% confident in answering the authentication question. A fourth row 602*d* indicates that, on Tuesday, User 1 was 70% confident in answering the authentication question. A fifth row 602*e* acts as an average of the second row 602*b*, the third row 602*c*, and fourth row 602*d*, and in particular indicates that, from the period of Monday through Tuesday, the users (e.g., User 1 and User 2) were 61.6% confident in their answers. If, for example, the threshold referenced in step 408 was 65%, then this average value might suggest that, on average, users might have difficulty answering a particular authentication question. In such a circumstance, the computing device might perform steps 409 through 411—that is, the computing device might add data which prevents the authentication question from being used in the future.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
one or more processors; and
memory storing instructions that, when executed by the one or more processors, cause the computing device to:
receive voice data indicating one or more vocal utterances by a user in response to an authentication question;
process the voice data;
determine, based on the processed voice data, a first confidence score that indicates a degree of confidence of the user when answering the authentication question;
modify an overall confidence score based on the first confidence score, wherein the overall confidence score is based on a plurality of confidence scores that each comprise an indication of a different degree of confidence of a different user when answering the authentication question; and
based on determining that the overall confidence score satisfies a threshold, store, in an authentication questions database, data preventing the authentication question from being used in future authentication processes corresponding to one or more different users.

2. The computing device of claim 1, wherein the instructions, when executed by the one or more processors, cause the computing device to process the voice data by causing the computing device to:
identify one or more words spoken by the user; and
identify at least one of the one or more words that indicates uncertainty.

3. The computing device of claim 1, wherein the instructions, when executed by the one or more processors, cause the computing device to process the voice data by causing the computing device to:
identify one or more periods where the user was silent.

4. The computing device of claim 1, wherein the instructions, when executed by the one or more processors, cause the computing device to:
remove, from the authentication questions database and after a period of time has elapsed, the data preventing the authentication question from being used in the future authentication processes.

5. The computing device of claim 1, wherein the instructions, when executed by the one or more processors, cause the computing device to store the data preventing the authentication question from being used in the future authentication processes further based on whether the user was provided access to an account.

6. The computing device of claim 1, wherein the threshold is based on a difficulty of the authentication question.

7. The computing device of claim 1, wherein the instructions, when executed by the one or more processors, cause the computing device to process the voice data by causing the computing device to determine the first confidence score by causing the computing device to determine one or more of:
a cadence indicated by the voice data;
a speed of speech indicated by the voice data;
a tone of speech indicated by the voice data;
a volume of the voice data; or
pronunciations of words indicated by the voice data.

8. A method comprising:
receiving, by a computing device, voice data indicating one or more vocal utterances by a user in response to an authentication question;
processing, by the computing device, the voice data;
determining, by the computing device and based on the processed voice data, a first confidence score that indicates a degree of confidence of the user when answering the authentication question;
modifying, by the computing device, an overall confidence score based on the first confidence score, wherein the overall confidence score is based on a plurality of confidence scores that each comprise an indication of a different degree of confidence of a different user when answering the authentication question; and
based on determining that the overall confidence score satisfies a threshold, storing, in an authentication questions database, data preventing the authentication question from being used in future authentication processes corresponding to one or more different users.

9. The method of claim 8, wherein processing the voice data comprises:
identifying one or more words spoken by the user; and
identifying at least one of the one or more words that indicates uncertainty.

10. The method of claim 8, wherein processing the voice data comprises:
identifying one or more periods where the user was silent.

11. The method of claim 8, further comprising:
removing, from the authentication questions database and after a period of time has elapsed, the data preventing the authentication question from being used in the future authentication processes.

12. The method of claim 8, wherein storing the data preventing the authentication question from being used in the future authentication processes is further based on whether the user was provided access to an account.

13. The method of claim 8, wherein the threshold is based on a difficulty of the authentication question.

14. One or more non-transitory computer-readable media storing instructions that, when executed by one or more processors, cause a computing device to:
receive voice data indicating one or more vocal utterances by a user in response to an authentication question;
process the voice data;
determine, based on the processed voice data, a first confidence score that indicates a degree of confidence of the user when answering the authentication question;
modify an overall confidence score based on the first confidence score, wherein the overall confidence score is based on a plurality of confidence scores that each comprise an indication of a different degree of confidence of a different user when answering the authentication question; and based on determining that the overall confidence score satisfies a threshold, store, in an authentication questions database, data preventing the authentication question from being used in future authentication processes corresponding to one or more different users.

15. The non-transitory computer-readable media of claim 14, wherein the instructions, when executed by the one or more processors, cause the computing device to process the voice data by causing the computing device to:
identify one or more words spoken by the user; and
identify at least one of the one or more words that indicates uncertainty.

16. The non-transitory computer-readable media of claim 14, wherein the instructions, when executed by the one or more processors, cause the computing device to process the voice data by causing the computing device to:
identify one or more periods where the user was silent.

17. The non-transitory computer-readable media of claim 14, wherein the instructions, when executed by the one or more processors, cause the computing device to:
remove, from the authentication questions database and after a period of time has elapsed, the data preventing the authentication question from being used in the future authentication processes.

18. The non-transitory computer-readable media of claim 14, wherein the instructions, when executed by the one or more processors, cause the computing device to store the data preventing the authentication question from being used in the future authentication processes further based on whether the user was provided access to an account.

19. The computing device of claim 1, wherein each of the plurality of confidence scores were determined based on different voice data of different users when answering the authentication question.

20. The method of claim 8, wherein each of the plurality of confidence scores were determined based on different voice data of different users when answering the authentication question.

* * * * *